United States Patent [19]

Kato et al.

[11] 4,276,473
[45] Jun. 30, 1981

[54] GRADATION PROCESSING METHOD AND APPARATUS FOR RADIATION IMAGE RECORDING SYSTEM

[75] Inventors: Hisatoyo Kato; Masamitsu Ishida; Seiji Matsumoto, all of Minami-ashigara, Japan

[73] Assignee: Fuji Photo Film Co., Ltd., Kanagawa, Japan

[21] Appl. No.: 124,770

[22] Filed: Feb. 26, 1980

[30] Foreign Application Priority Data

Feb. 28, 1979 [JP] Japan .................................. 54/23092

[51] Int. Cl.³ .......................... G03C 5/16; G01T 1/11
[52] U.S. Cl. ................................... 250/327.1; 250/337
[58] Field of Search ............. 250/322, 416 TV, 327.1, 250/337

[56] References Cited

U.S. PATENT DOCUMENTS

| | | | |
|---|---|---|---|
| 3,859,527 | 1/1975 | Luckey | 250/327.1 |
| 3,975,637 | 8/1976 | Ikedo et al. | 250/327.1 |
| 4,149,076 | 4/1979 | Albert | 250/416 TV |

*Primary Examiner*—Alfred E. Smith
*Assistant Examiner*—Carolyn E. Fields

*Attorney, Agent, or Firm*—Gerald J. Ferguson, Jr.; Joseph J. Baker

[57] ABSTRACT

In a radiation image recording system in which a radiation image is once recorded in a stimulable phosphor and then read out and reproduced on a recording material, the gradation of the radiation image is processed to enhance the diagnostic efficiency and accuracy of the image. The radiation image is read out by scanning the stimulable phosphor by a stimulating ray to cause the phosphor to emit light of the amount corresponding to the radiation energy stored in the phosphor. The emitted light is detected and converted to an electric signal. The level of the electric signal is converted in such a way that the maximum level of the signal corresponding to the maximum density of the radiation image is converted to a level resulting in the optical density of 1.5 to 2.8 in the reproduced image on a recording material and the minimum level corresponding to the minimum density is converted to a level resulting in the optical density of fog density of the recording material to fog density plus 0.3, and a density curve in a coordinate having an ordinate representing the optical density and an abscissa representing the level of the electric signal has a positive gradient from the minimum level to the maximum level.

18 Claims, 6 Drawing Figures

GRADATION PROCESSING METHOD AND APPARATUS FOR RADIATION IMAGE RECORDING SYSTEM

BACKGROUND OF THE INVENTION

1. Field of the Invention

This invention relates to a method of processing the gradation of a radiation image used for medical diagnosis and apparatus for carrying the method. This invention particularly relates to an image gradation processing method and apparatus for processing the gradation of a radiation image which is read out from a stimulable phosphor carrying the radiation image stored therein and reproduced into a visible image.

2. Description of the Prior Art

For medical diagnosis, there are generally used X-ray films for taking radiographs. Since the X-rays do harm to the human body, it is impossible or undesirable from the viewpoint of safety to expose the human body to X-rays of high dose. Therefore, it is desirable that the necessary information in the radiograph can be obtained by exposing the human body only once to the X-rays of comparatively low dose. On the other hand, radiographs should preferably have both a wide exposure latitude and high image quality of high contrast, high sharpness, low noise etc. for viewing and diagnosis purposes. Unfortunately, since the conventional radiography is designed so as to satisfy all the required conditions to some extent, the range of recording density or the ability to record various levels of information and the image quality are both insufficient and neither of these properties are completely satisfied.

In view of the above circumstances, it has been proposed in U.S. Pat. No. 3,859,527 to have a radiation passing through an object be absorbed by a stimulable phosphor and then stimulate the phosphor by light energy to cause the phosphor to emit the radiation energy stored therein as light so that the emitted light is detected and converted to an electric signal used for reproducing a visual image.

This radiation image system using the stimulable phosphor is advantageous over the conventional radiography using a silver halide photographic material in that the image can be recorded over a very wide range of radiation exposure and further in that the electric signal used for reproducing the visible image can be freely processed to improve the image quality for viewing and diagnosis purposes. In more detail, since the amount of light emitted upon stimulation after the radiation energy is stored in the phosphor varies over a very wide range in proportion to the amount of energy stored therein, it is possible to obtain an image having desirable density regardless of the amount of exposure of the phosphor to the radiation by converting the emitted light to an electric signal and changing the level of the electric signal to a desirable level corresponding to the desirable optical density of the image reproduced on a photographic film or the like. This is very advantageous in practical use. For instance, when there are differences in exposure among a number of radiation images or there are over- or under-exposure images in a number of radiation images, these images can be processed to have the same level of optical density finally. Accordingly, the mistakes in the step of exposure can be corrected easily. Further, the optical density of the finally obtained image can be freely selected simply by changing the level of the electric signal used for reproducing the image, and accordingly, it is possible to easily obtain an image having a desirable density for any kind of image. In other words, in the radiation image of the human body the desirable density is different depending upon the kind of the image. In one kind or part of the human body a high density is desirable for obtaining high diagnostic efficiency and accuracy and in another kind or part a low density is desirable. In the conventional radiography, the exposure is controlled to obtain the desirable density for the various kinds of images. In this sense, the above-mentioned system utilizing the stimulable phosphor and a gradation processing means is very advantageous. Furthermore, in the conventional radiography a number of films of different sensitivity are prepared to be accommodated to a number of intensifying screens of different sensitivity. In the above-mentioned system, however, it is unnecessary to prepare a number of films of different sensitivity since one kind of film can be accommodated to various conditions of exposure and various sensitivities of the intensifying screen by later changing the level of the electric signal as desired.

As mentioned above, in the radiation image recording system using a stimulable phosphor the image information having a very wide range of level corresponding to the very wide range of exposure is once stored in the stimulable phosphor and is then read out and converted to an electric signal and finally converted to a visible image after processing the electric signal as desired. Therefore, the optical density of the finally obtained visible image or reproduced image can be controlled to the level desirable for diagnosis purposes. Thus, a radiation image having high diagnostic efficiency and accuracy can be obtained.

In order to put the above-mentioned radiation image recording system into practice, the aforesaid processing of the electric signal should be quantitatively standardized for all kinds of radiation images. The standardization should be conducted from the viewpoint of enhancing the diagnostic efficiency and accuracy (the level of easiness for diagnosis or adaptability to diagnosis). The diagnostic efficiency and accuracy are not simply enhanced by simply making so-called good image for the viewpoint of the ordinary image quality factors such as sharpness, granularity and contrast. Rather than these factors, the diagnostic efficiency and accuracy are influenced by other complex factors such as reference with the normal shade, reference with the anatomical structure and utilization of other diagnostic view or records. Thus, the standardization to quantitatively standardize the process of the electric signal used for reproducing the radiation image to enhance the diagnostic efficiency and accuracy is not yet clarified or established.

SUMMARY OF THE INVENTION

The primary object of the present invention is to provide a method of processing the gradation of a radiation image in a radiation image recording system using a stimulable phosphor to improve the diagnostic efficiency and accuracy.

Another object of the present invention is to provide an apparatus for processing the gradation of a radiation image in a radiation image recording system using a stimulable phosphor to improve the diagnostic efficiency and accuracy.

The specific object of the present invention is to provide a method of and apparatus for processing the gradation of a radiation image in a radiation image recording system using a stimulable phosphor which are capable of enhancing the diagnostic efficiency and accuracy in all kinds of radiation image.

The method of processing the gradation of a radiation image in accordance with the present invention is characterized in that the image information corresponding to the minimum level of the electric signal is reproduced in the optical density within the range of the fog density of the recording material to the fog density plus 0.3 (optical density), and the image information corresponding to the maximum level of the electric signal is reproduced in the optical density within the range of 1.5 to 2.8 (optical density), and the density of the reproduced image having the level between the minimum and maximum levels increases monotoneously. In other words, in the present invention, the level of the electric signal is changed at the minimum and maximum levels thereof to said levels and is changed at the level therebetween so that the gradient of the density of the reproduced image with respect to the level of the electric signal is always positive.

In the present invention, the diagnostic efficiency and accuracy are further enhanced by generally lowering the level of the electric signal between the minimum and maximum levels with the degree of lowering being made largest at a predetermined level (to be mentioned below) therebetween. In this particular method, the level of the electric signal or the optical density of the reproduced image is lowered by the degree of 0.5 or less in terms of optical density at the predetermined level and the degree of lowering is made decreased as the level is remote from the predetermined level.

Further, in the present invention, the diagnostic efficiency and accuracy is further enhanced by making the rate of change (derivatives) of the gradient always positive or zero in the range of the level lower than said predetermined level corresponding to the range of the density lower than the density corresponding to said predetermined level.

The apparatus in accordance with the present invention is provided with a signal processing means for carrying out the above method that is a signal processing means which converts the electric signal of the level corresponding to the minimum and maximum values of the amount of light emitted by the phosphor to the electric signal of said two kinds of levels and further converts the electric signal of the level therebetween in a monotonous increasing function.

In the present invention, it should be noted that the maximum and minimum levels of the electric signal or the maximum and minimum amount of the emitted light does not simply mean the maximum and minimum values among the electric signals or the amounts of the emitted light but means the maximum and minimum values among those within the image portion which is desired to be reproduced. In other words, for instance, the background of the image to be reproduced should be excluded from the signal among which the maximum or minimum values are to be determined. In the frontal chest radiation image, the background of the human body or the portion outside the lungs is to be excluded in this sense.

The maximum and minimum values can be determined on basis of various signals obtained in the course of the radiation image recording system. For instance, the following method can be used for the maximum and minimum values; (1) the instantaneous light emission observed when the stimulable phosphor is exposed to a radiation at first in the recording step (U.S. Patent Application Ser. No. 81,917), (2) the light emission observed when the stimulable phosphor is stimulated by a read-out stimulating ray, (3) the radiation used for exposure of the phosphor in the recording step, (4) the radiation transmitting through the stimulable phosphor observed when the stimulable phosphor is exposed to a radiation in the recording step, or (5) the light emitted by a monitoring phosphor sheet located behind the stimulable phosphor observed when the stimulable phosphor is exposed to a radiation.

In order to determine the desired maximum and minimum values that is the maximum and minimum levels of the electric signal, for instance, within the range corresponding to the area of the object to be reproduced, a histogram can be utilized for example. In more detail, the obtained signal levels are all put into a memory and a histogram is made by use of the memorized signal levels. The histogram thus obtained usually has several peaks in the coordinate having the ordinate representing the frequency and the abscissa representing the level of the signal. The upper and lower end where the frequency falls to zero or falls to about 5% of the maximum frequency can be determined as the maximum and minimum levels. Further, it is possible to determine the two extreme values by use of the particular shape of the histogram for various kinds of object. For instance, in case of the frontal chest radiograph, three peaks appear and the peak on the highest signal level usually shows the maximum frequency which represents the lungs. The foot of the higher signal level of the said peak where the frequency falls to 5% or zero of the maximum frequency can be determined as the maximum value, and the foot of the lower signal level of the peak on the lowest signal level that represents the spine where the frequency falls to 5% or zero of the maximum frequency can be determined as the minimum value.

Another method of determining the maximum and minimum values is to utilize the signal level obtained when a central part of the image is linearly scanned. For instance, in case of a mammogram, the level of the signal obtained by scanning the mammogram linearly through the central part thereof shows the density corresponding to the background, skin, subcutaneous tissue and glandular tissue in this order. In this case, the level greatly changes when the scanning is done from the background to the skin. Since the skin has the highest density in the image reproduced, the level immediately after the great change of level can be determined as the maximum level. Further, since the glandular tissue has the lowest density, the lowest level where the level has changed stepwise from the skin, the subcutaneous tissue and to the glandular tissue can be determined as the minimum level. Alternatively, it is possible to memorize the level around the minimum level in a memory and determine the minimum value in the memorized level as the minimum level.

The minimum level and the maximum level thus obtained are converted to the levels corresponding to the optical density in the reproduced image of the fog density to the fog density plus 0.3 in terms of optical density and of 1.5 to 2.8, respectively. The fog density to the fog density plus 0.3 is the minimum value at which radiologists can practically read image. The optical density of 1.5 to 2.8 is the maximum value at which radiologists can read image easily. These ranges of the optical density for the minimum and maximum levels are preferably fog density to fog density plus 0.2 and 1.8 to 2.6.

The above mentioned conversions are able to be represented by the formulae as follows:

fog density ≦ Dmin = f(Smin) ≦ fog density + 0.3

1.5 ≦ Dmax = f(Smax) ≦ 2.8 where Dmin and Dmax are minimum and maximum densities in the reproduced image, and Smin and Smax are minimum and maximum levels of the electric signal or other kind of signal determined as the minimum and maximum levels as mentioned hereinbefore. D=f(S) means a function of the signal representing the optical density in the reproduced image, where, as mentioned below, S means logS.

Between the minimum level and the maximum level, the level may be converted into a function as represented by a formula of f(S) where the gradient of said function $$(\gamma = \frac{\partial f(S)}{\partial S})$$

is positive in a coordinate in which the ordinate represents the optical density (D) in the reproduced image and the abscissa represents the level of the signal (S) in logarithmic scale; (logS). More preferably, the level between the minimum and maximum levels should be lowered with the level lowered at most at a predetermined level (Sp) therebetween. This can be represented by a formula f(Sp) < f₀(Sp).

f₀(S) means a linear function which passes at (Smin, Dmin) and (Smax, Dmax). By lowering the level like this, the contrast of the image in the range of lower density is lowered and the contrast in the higher density is raised, which results in enhancement of diagnostic efficiency and accuracy in the radiographs for medical use.

Examples are followed. (1) In the image of frontal chest, since the density in the lung area is generally lowered and the contrast in such area is raised, the image becomes clearly visible. On the other hand, although the contrast in the heart and spine area is lowered, their visibility does not almost change since human eyes have high sensitivity in a low density area. (2) In the image of bone, the details of the muscle around the bone become clearly visible. (3) In the image of double contrasted stomach, the density in the area filled with barium is lowered and the whole image become clearly visible. (4) In the image of abdomen, the density of the background is generally lowered and the image of internal organs becomes clearly visible.

Further, between the minimum level and the maximum level, it is preferred that the function D=f(S) has such a curve that the rate of change of the gradient (∂γ/∂S) of the curve drawn in the coordinate having the ordinate representing the optical density (D) in the reproduced image and the abscissa representing the level of the signal (S:more exactly the logarithm of the signal S; logS) is positive or zero at least in the range below a predetermined level Sp between the minimum and maximum levels. In the range above the predetermined level Sp, the rate of change of the gradient may not be positive or zero so long as the gradient ( $$(\gamma = \frac{\partial f(S)}{\partial S})$$

is positive since the visibility of radiographic details in such high density area are found to be insensitive to the rate of change of the gradient. On the contrary, in the range below the predetermined level Sp, the diagnostic efficiency and accuracy are markedly influenced by changing the rate of change of the gradient. It seems that, in such low density areas, radiographic details are rich and that their visibility changes dramatically depending upon the density rendition.

The stimulable phosphor referred to in this invention means a phosphor which is able to store radiation energy upon exposure thereof to a high energy radiation and then emits light according to the stored energy upon optical stimulation. The high energy radiation referred to here includes X-rays, gamma rays, beta-rays, alpha-rays, neutron-rays, ultraviolet-rays and the like.

As for the stimulating rays for stimulating the phosphor after the phosphor is excited with the radiation energy in an image pattern, a light beam having high directivity like a laser beam is used. As the light beam, a light beam having a wavelength within the range of 500 to 800 nm, preferably of 600 to 700 nm is preferred. If a color filter which cuts the light having a wavelength beyond the above range is used together with a light source, a light source having a wavelength distribution beyond said range can be used.

As for the stimulating ray source which emits the light having the above mentioned wavelength region, a Kr-laser (647 nm), a He-Ne laser (633 nm), various kinds of light emitting diode, a rhodamine B dye laser and the like can be used. Further, a tungsten iodine lamp having a wide wavelength distribution covering near ultraviolet rays, visible light and infrared rays can be used if combined with a cut filter which only transmits light of the wavelength within the range of 500 to 800 nm or 600–700 nm.

Since the ratio of the stimulating energy and emitted light energy is generally $10^4:1$ to $10^6:1$, the S/N ratio would be markedly lowered if the stimulating ray should enter the photodetector. Therefore, in order to prevent the lowering of the S/N ratio, it is desirable to make the wavelength distribution of the stimulating ray different from and for apart from the wavelength distribution of the light emitted from the stimulable phosphor.

In order to meet this requirement, the stimulable phosphor is desired to emit light having a wavelength within the range of 300 to 500 nm. For example, rare earth activated alkaline earth metal fluorohalide phosphor is preferred. On example of this phosphor is, as shown in Japanese Patent Application Ser. No. 53(1978)-84742, a phosphor represented by the formula $(Ba_{1-x-y},Mg_x,Ca_y)FX:aEu^{2+}$ wherein X is at least one of Cl and Br, x and y are positive numbers which satisfy $0 < x+y \leq 0.6$ and $xy \neq 0$, and a is a number satisfying $10^{-6} \leq a \leq 5 \times 10^{-2}$. Another example of this phosphor is, as shown in Japanese Patent Application Ser. No. 53(1978)-84744, a phosphor represented by the formula $(Ba_{1-x},M^{II}_x)FX:yA$ wherein $M^{II}$ is at least one of Mg, Ca, Sr, Zn and Cd, X is at least one of Cl, Br and I, A is at least one of Eu, Tb, Ce, Tm, Dy, Pr, Ho, Nd, Yb and Er, x is a number satisfying $0 \leq x \leq 0.6$, and y is a number satisfying $0 \leq y \leq 0.2$. Further, as the stimulable phosphor to be used in this invention can be used ZnS:Cu,Pb; $BaO \cdot xAl_2O_3$:Eu wherein $0.8 \leq x \leq 10$; and $M^{II}O \cdot xSiO_2$:A wherein $M^{II}$ is Mg, Ca, Sr, Zn, Cd or Ba, A is Ce, Tb, Eu, Tm, Pb, Tl, Bi or Mn, and x is a number satisfying $0.5 \leq x \leq 2.5$, as shown in Japanese Patent Application Ser. No. 53(1978)-84740. Furthermore, as the stimulable phosphor can be used LnOX:xA wherein Ln is at least one of La, Y, Gd and Lu, X is at least one of Cl and Br, A is at least one of Ce and Tb, x is a number satisfying $0<x<0.1$, as shown in Japanese Patent Application Ser. No. 53(1978)-84743. Among the above numerated phosphors, the rare earth activated alkaline earth metal fluorohalide phosphor is the most preferable, among which barium fluorohalides are the most preferable in view of the high intensity of emission of light.

Further, it is desirable to color the phosphor layer of the stimulable phosphor plate made of the above phosphor by use of pigments or dyes to improve the sharpness of the image obtained thereby as disclosed in Japanese Patent Application Ser. No. 54(1979)-71604.

DESCRIPTION OF PREFERRED EMBODIMENTS

The present invention will hereinbelow be described in further detail with reference to the accompanying drawings.

Figure 1:
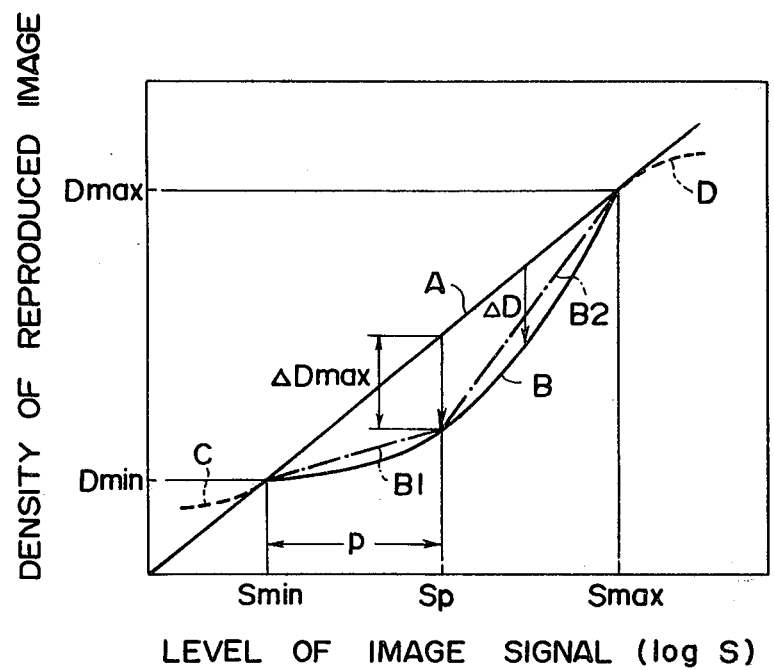
FIG. 1 is a graph showing a density-signal curve which represents the gradation processing conducted in accordance with the present invention.

FIG. 1 shows a graph which represents the signal conversion in a coordinate having the ordinate representing the optical density (D) and the abscissa representing the level of the electric signal (S) in logarithmic scale; (logS). The optical density (D) is of the finally reproduced image on a recording material and the electric signal level (S) is of the electric signal obtained by an image read-out means which reads the image information from the stimulable phosphor. The graph shown in FIG. 1 is therefore a curve representing the function of the signal conversion. The maximum level of the electric signal (S) is indicated by Smax and the minimum level thereof is indicated by Smin. The maximum density which is in the range of 1.5 to 2.8, preferably 1.8 to 2.6, is indicated by Dmax, and the minimum density which is in the range of the fog density to the fog density plus 0.3, preferably the fog density to the fog density plus 0.2, is indicated by Dmin.

The method of the present invention is characterized basically in that the Smax and Smin are made to correspond to the Dmax and Dmin, respectively, and the level therebetween is converted in the function f(S), for example, the linear function $f_0(S)$ as shown by the straight line A in FIG. 1, that is represented by a formula $$D = f(S) = f_0(S)$$

Though the abscissa shows exactly logS, the level will be simply designated by S. The present invention is characterized in that the function f(S) has a positive gradient $$(\gamma = \frac{\partial f(S)}{\partial S} > 0).$$

In a preferred embodiment particularly for a radiograph for medical diagnosis purposes, the density is generally lowered with the degree of lowering made largest at a predetermined level Sp as shown by lines B1 and B2. The degree of lowering is indicated by $\Delta D$, which is the largest at the predetermined level Sp and gradually decreases as the level is remote from the predetermined level Sp. The largest degree of lowering of the density at the predetermined level Sp is indicated by $\Delta Dmax$. By this process, the gradient or contrast ($\gamma$) in the range of low density is lowered as shown in the line B1 and the gradient or contrast ($\gamma$) in the range of high density is raised as shown in the line B2, whereby the diagnostic efficiency and accuracy are enhanced. The greatest degree of lowering the density $\Delta Dmax$ is made to be 0 to 0.5. When $\Delta Dmax$ is zero, the curve becomes as shown by line A. When $\Delta Dmax$ is positive, the curve becomes as shown by curve B. The greatest degree of lowering the density is preferably 0.1 to 0.45. Practically, the curve B is preferred to have a smooth shape (mathematically, the derivative $\partial f(S)/\partial S$ is continuous function) so that the density will smoothly and gradually vary throughout the range between the minimum and maximum levels.

The predetermined level Sp at which the density is lowered to the most extent should preferably be selected such that the height p thereof from the minimum level Smin, i.e.

$$p = \frac{Sp - Smin}{Smax - Smin},$$

is within the range of 0.1 to 0.7 so as to enhance the diagnostic efficiency and accuracy.

Where the height p is less than 0.1, the level Sp at which the density is most lowered becomes too close to the minimum level Smin and the gradient $\gamma$ becomes too close to zero or becomes minus and the contrast becomes too low or reversed, which lowers the diagnostic efficiency and accuracy. When the height p is more than 0.7, the level Sp becomes too close to Smax and the gradient $\gamma$ is lowered throughout the most part of the level and the gradation becomes similar to the gradation as obtained when Dmax is simply lowered, which does not enhance the diagnostic efficiency and accuracy. As an example of the level Sp which satisfied the restriction of p mentioned above can be used a mean signal level (S) or the maximum frequency signal level (Sm). The simple arithmetic mean of Smax and Smin, i.e. (Smax+Smin/2), can be used therefor.

The aforesaid condition that the gradient $\gamma$ should be always positive is required for the contrast not to be reversed, and the other condition that the rate of change of the gradient $\partial\gamma/\partial S$ should always be positive or zero is preferred for enhancing the diagnostic efficiency and accuracy in the radiograph for medical diagnosis. In FIG. 1, the latter condition means that the curve has an increasing gradient as the curve B in which the contrast increases as the density of the image increases. This enhances the diagnostic efficiency and accuracy. The rate of change may be partially positive and partially zero. When the rate of change is always zero, the curve becomes as the straight line A.

For the levels outside the range between Smax and Smin, the curve is desired to continue smoothly from the both ends of the curve A or B as shown by curves C and D in FIG. 1, since it is impossible to extend the curve upward and downward to much extent because of the limited density of the recording material.

The reasons for the above mentioned various requirements will hereinbelow be described in detail with reference to data of various tests.

The results of the method in accordance with the present invention cannot be simply evaluated by the normal factors for evaluating photographic images such as sharpness, granularity and contrast, but should be subjectively evaluated. Therefore, in order to evaluate the results, the radiation images obtained in accordance with the present invention were evaluated by six radiologists together with the radiation images obtained in accordance with the conventional method or the method in which the requirements of this invention are not completely met.

The standard of evaluation was as follows.

+2: The diagnostic efficiency and accuracy were much enhanced in comparison with the conventional radiography.
+1: The diagnostic efficiency and accuracy were enhanced in comparison with the conventional radiography.
0: The diagnostic efficiency and accuracy were hardly improved.
−1: The diagnostic efficiency and accuracy were lowered in comparison with the conventional radiography.
−2: The diagnostic efficiency and accuracy were much lowered in comparison with the conventional radiography.

Under the above standard, 20 samples of the radiation image as follows were evaluated.

| Plain image | Frontal chest | 6 samples |
| --- | --- | --- |
|  | Abdomen | 2 |
| Contrasted image | Stomach | 3 |
|  | Abdomen | 4 |
|  | Angiogram | 3 |
| Tomographic image | Chest | 2 |

As the conventional radiographs, several X-rays film images obtained by a film-screen system were used for comparative evaluation.

Figure 2:
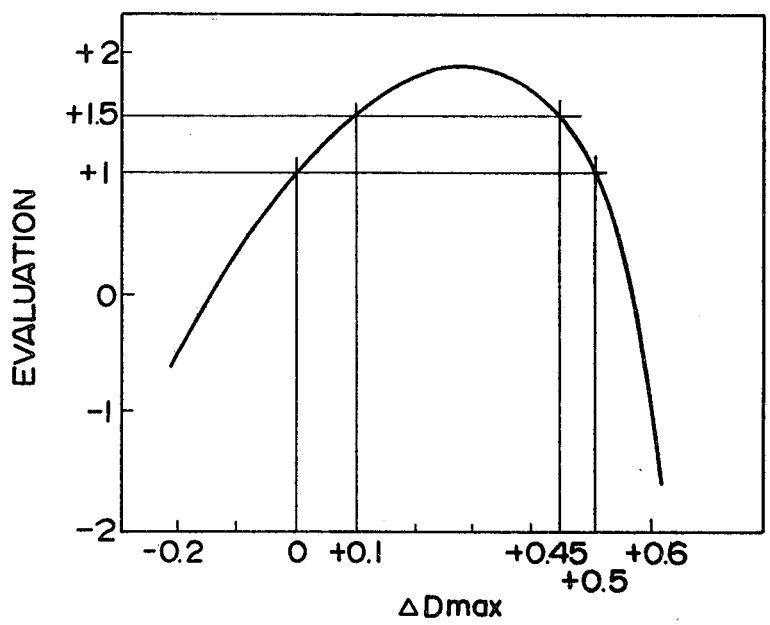
FIG. 2 is a graph showing the relationship between the evaluation of the diagnostic efficiency and accuracy and the degree of lowering of the density conducted in an embodiment of the present invention to show the preferable range of the maximum degree of lowering of the density.
Figure 3:
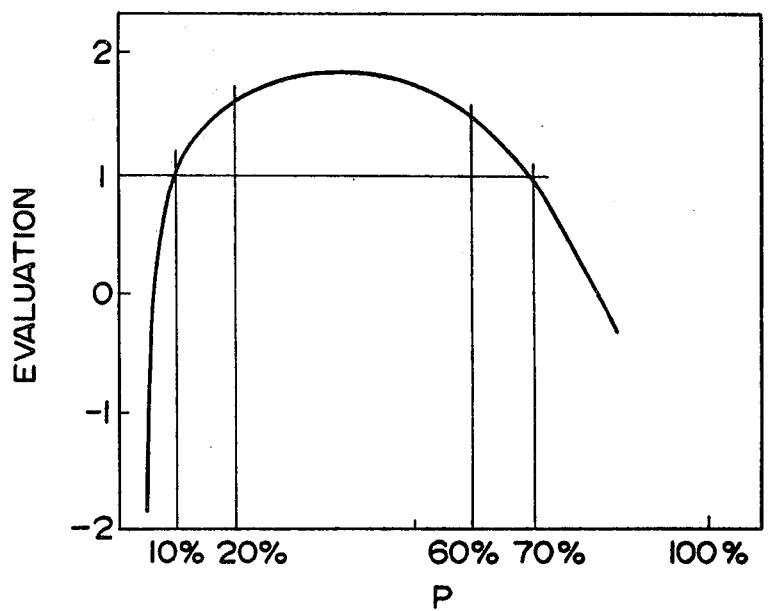
FIG. 3 is a graph showing the relationship between the evaluation of the diagnostic efficiency and accuracy and the height of the level of the signal from the minimum level Smin which is desirable to be the level at which the level is lowered at most.

The results of the evaluation are shown in FIGS. 2 and 3. FIG. 2 shows the relationship between the average of the evaluation values represented along the ordinate and the maximum degree of lowering $\Delta Dmax$ at the predetermined level Sp where the height p is 0.35 represented along the abscissa. As shown in FIG. 2, the evaluation value becomes not less than +1 in the range of 0 to 0.5 of $\Delta Dmax$. Outside this range the evaluation markedly falls below +1. In the range between 0.1 and 0.45, the evaluation becomes not less than +1.5. Further, it was confirmed that the same range was preferable when the Sp was selected at the height of 0.2 and 0.6.

FIG. 3 shows the relationship between the average evaluation represented along the ordinate and the height p of the level Sp from Smin defined hereinbefore designated in terms of % in FIG. 3 represented along the abscissa. As shown in FIG. 3, evaluation becomes not less than +1 in the range of 10% to 70%. Outside this range the evaluation markedly falls below +1. In the range between 20% to 60%, the evaluation becomes not less than +1.5. The degree of the maximum lowering $\Delta Dmax$ was set at 0.3 in this case. Further, it was confirmed that the same range was preferable when the $\Delta Dmax$ was selected as 0.1 and 0.45.

The present invention will be described in further detail with reference to preferred embodiments thereof as shown in the drawings.

Figure 4:
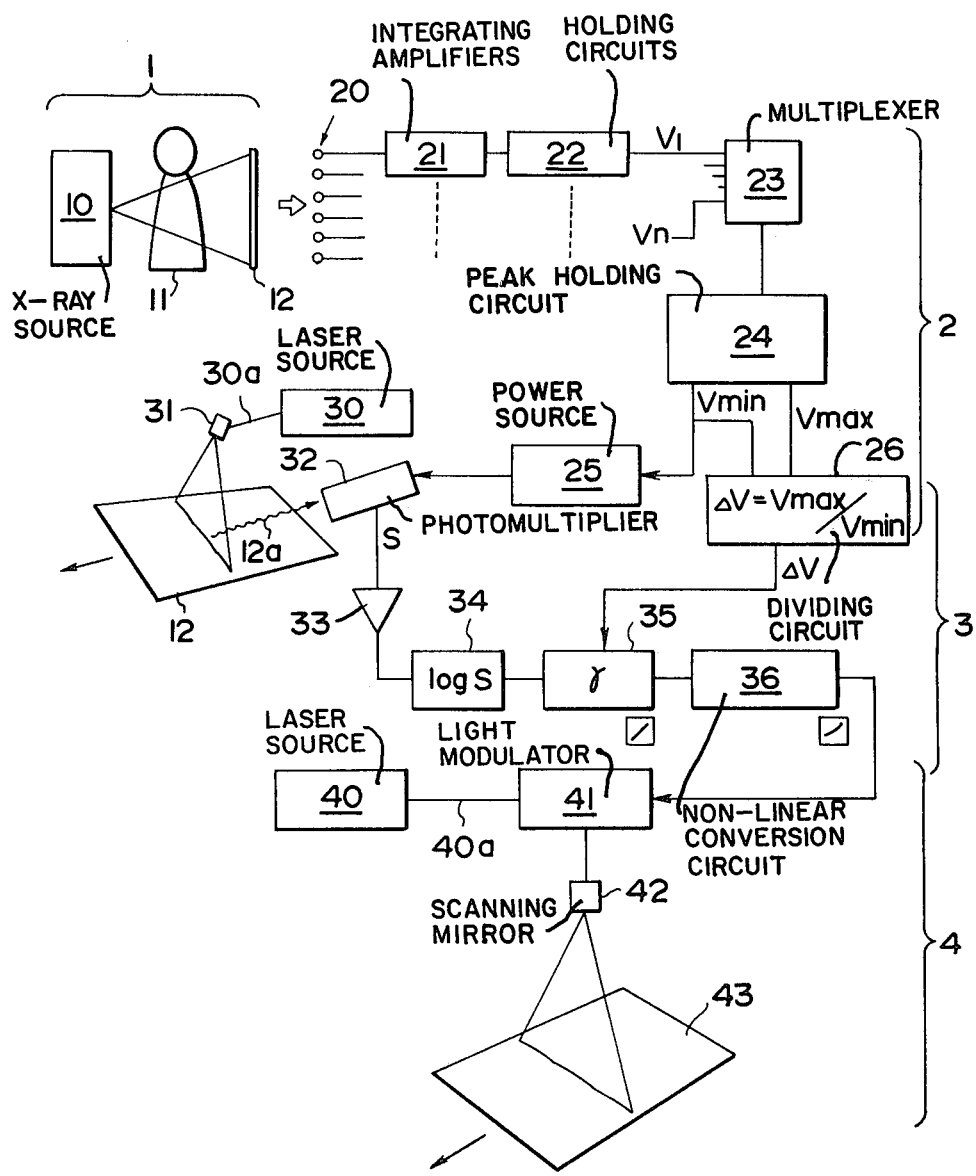
FIG. 4 is a schematic diagram showing the whole system of the radiation image recording system in which an embodiment of the apparatus in accordance with the present invention is employed.

FIG. 4 shows an embodiment of the radiation image recording system in which the present invention is employed wherein the amount of light emitted instantaneously from the stimulable phosphor at the time of exposure to a radiation for recording is detected and used for determining the maximum and minimum values of the signal S to be used for reproducing the image. The amount of light emitted instantaneously from the stimulable phosphor at the time of recording is indicated by V and the amount of light emitted from the stimulable phosphor upon stimulation thereof is indicated by S. The maximum and minimum values Vmax and Vmin are used as the maximum and minimum vaues Smax and Smin of the signal.

Referring to FIG. 4, in the image input section 1 an X-ray source 10 is used for making a radiation image of an object 11 on a stimulable phosphor sheet 12. The image once recorded in the stimulable phosphor 12 is read out at a read-out section 3 and reproduced at a recording section 4. In order to obtain the necessary information such as Smax and Smin, an information input section 2 is provided in connected with the read-out section 3.

At the time the phosphor sheet 12 is exposed to the radiation of X-rays in the image input section 1, the phosphor sheet 12 instantaneously emits light. The emitted light is detected by a matrix of photodetectors 20 located behind the phosphor sheet 12 and converted to an electric signal having a level corresponding to the amount of light V emitted. As the photodetectors 20 can be used photodiodes arranged in a matrix of 6×6=36 covering the sheet 12 of, for instance, 30 cm×30 cm. The output of the photodetectors 20 is integrated by integrating amplifiers 21 and the output is held by holding circuits 22. Thus, the outputs V1, V2, . . . Vn of the holding circuits 22 are put into a multiplexer 23 for conducting switching. The output through the switching is input into a maximum and minimum discriminating circuit 24 like a peak holding circuit for determining the maximum Vmax and minimum Vmin. The minimum value Vmin is input into a high voltage power source 25 of a photomultiplier 32 of the read-out section for setting the gain thereof and is used for changing the voltage of the high voltage source by a servo-motor or the like. Alternatively, the minimum value Vmin may be used for controlling the gain of the photomultiplier 32 by changing the bleeder resistance thereof. The maximum value Vmax is input into a dividing circuit 26 for setting the gamma, the gradient $\gamma$, together with the minimum value Vmin. The dividing circuit 26 thus outputs the ratio Vmax/Vmin which is equal to gamma (Vmax/Vmin=$\Delta$V=$\gamma$). The output $\Delta$V is used for changing the gain of the amplifier for changing the gamma in the read-out section.

In the read-out section 3, the stimulable phosphor 12 in which the X-ray image of the object 11 is recorded is scanned by a laser beam 30$a$ from the laser beam source 30 impinging thereon by way of a scanning mirror 31. The light emitted upon scanning thereof by the laser beam 30$a$ designated by 12$a$ is read out by a photomultiplier 32. The output of the photomultiplier 32 is amplified by an amplifier 33 and is log-converted by a log-conversion circuit 34, and then the gradient thereof is changed by a gamma ($\gamma$) conversion circuit 35. Thus, the straight line A of FIG. 1 is obtained. This is then subjected to a non-linear process by a non-linear conversion circuit 36 into a curve as the curve B in FIG. 1. Thereafter, the function represented by the curve is input into a light modulator 41 in the recording section 4.

In the recording section 4, the laser beam 40$a$ from the laser source 40 for recording is modulated by the light modulator 41 and scanned by a scanning mirror 42 on a photosensitive material 43 like a photographic film to reproduce a visible radiation image.

As the laser source 30 for reading out the image in the read-out section 3 and the laser source 40 for recording the image in the recording section 4, can be used a He-Ne laser for instance.

The stimulable phosphor sheet 12 in the read-out section 3 and the photosensitive material 43 in the recording section 4 are moved in synchronization with each other in the direction perpendicular to the scanning direction by the mirrors 31 and 42.

It should be noted that the recording step may be separated from the read-out step by, for instance, once recording the read-out signal in a tape or the like and inputing the recorded signal into a recording section 4 at the time of recording. Further, the recording system in the recording section 4 may not be the direct recording type using a laser beam but may be an indirect type in which the read-out signal is once displayed on a CRT and the CRT is photographed on a photographic film. It is of course possible to record the image on a thermosensitive material by use of a heat ray. Other recording means of various types can also be used.

In the above-mentioned embodiment, the maximum and minimum values Vmax and Vmin are obtained by use of a maximum and minimum discriminating circuit 24. It is, however, possible to calculate these values Vmax, Vmin by use of a digital circuit after A/D converting the values V1, V2, .. Vn by switching the multiplexer 23 and memorizing the A/D converted values in a digital memory. As the method of calculation for this purpose, other than the calculation to obtain the maximum and minimum values comparing the V1, V2, .. Vn, it is possible to calculate the Vmax and Vmin by the formulae $$\left( \begin{array}{l} V\text{max} = \overline{V} + 2\sigma \\ V\text{min} = \overline{V} - 2\sigma \end{array} \right.$$

using dispersion $\sigma$ represented by $$\sigma = \sqrt{\frac{\sum\limits_n (\overline{V} - Vi)^2}{n - 1}}$$

where n is the number of the photodetectors and $\overline{V}$ is the means value of Vi.

Further, in the above embodiment, the setting of the gain of the photomultiplier 32 and the setting of gamma can be made in the form of change-over of channels. In this case, when the Vmax and Vmin are analog values, an analog switch is used and when these values are digital values, a digital switch is used for changing over the channels. Further, the setting of the gain is conducted by changing the voltage of the high voltage power source of the photomultiplier 32 in the above embodiment. This may be replaced by a type in which the gain of the amplifier 33 for amplifying the output of the photomultiplier 32 can be changed. However, since the noise of the amplifier 33 is also amplified when the gain is raised, the setting of the gain should preferably conducted by changing the gain of the photomultiplier 32.

Figure 5:
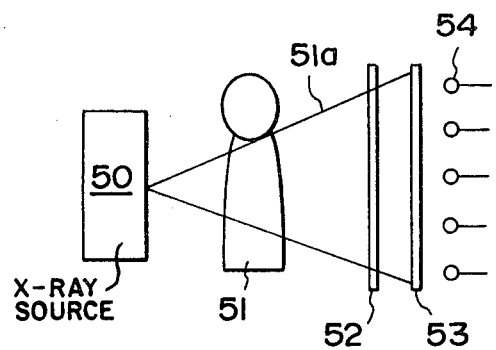
FIG. 5 is a schematic view showing a part of the system in which another embodiment of the present invention is employed.

FIG. 5 shows another embodiment in which X-rays 51$a$ from the X-ray source 50 are received by a stimulable phosphor sheet 52 and a monitoring phosphor sheet 53 located therebehind. The X-rays 51$a$ passing through an object 51 carrying the radiation image information are therefore detected by a number of photodetectors 54 located behind the monitoring phosphor sheet 53 simultaneously with the recording of the image in the stimulable phosphor 53. As the monitoring phosphor sheet 53 can be used a Zn(Cd)S:Ag plate. As the photodetectors 54 can be used a matrix of pin photodiodes of 5×5=25 pieces. Since the amount of light emitted from the monitoring phosphor sheet 53 is considered to be in proportion to the light emitted from the stimulable phosphor 52 upon stimulation at the time of read-out, the output of the photodetector 54 can be treated in the same manner as the output of the photodetectors 20 in the above embodiment to conduct the similar processing of gradation.

Figure 6:
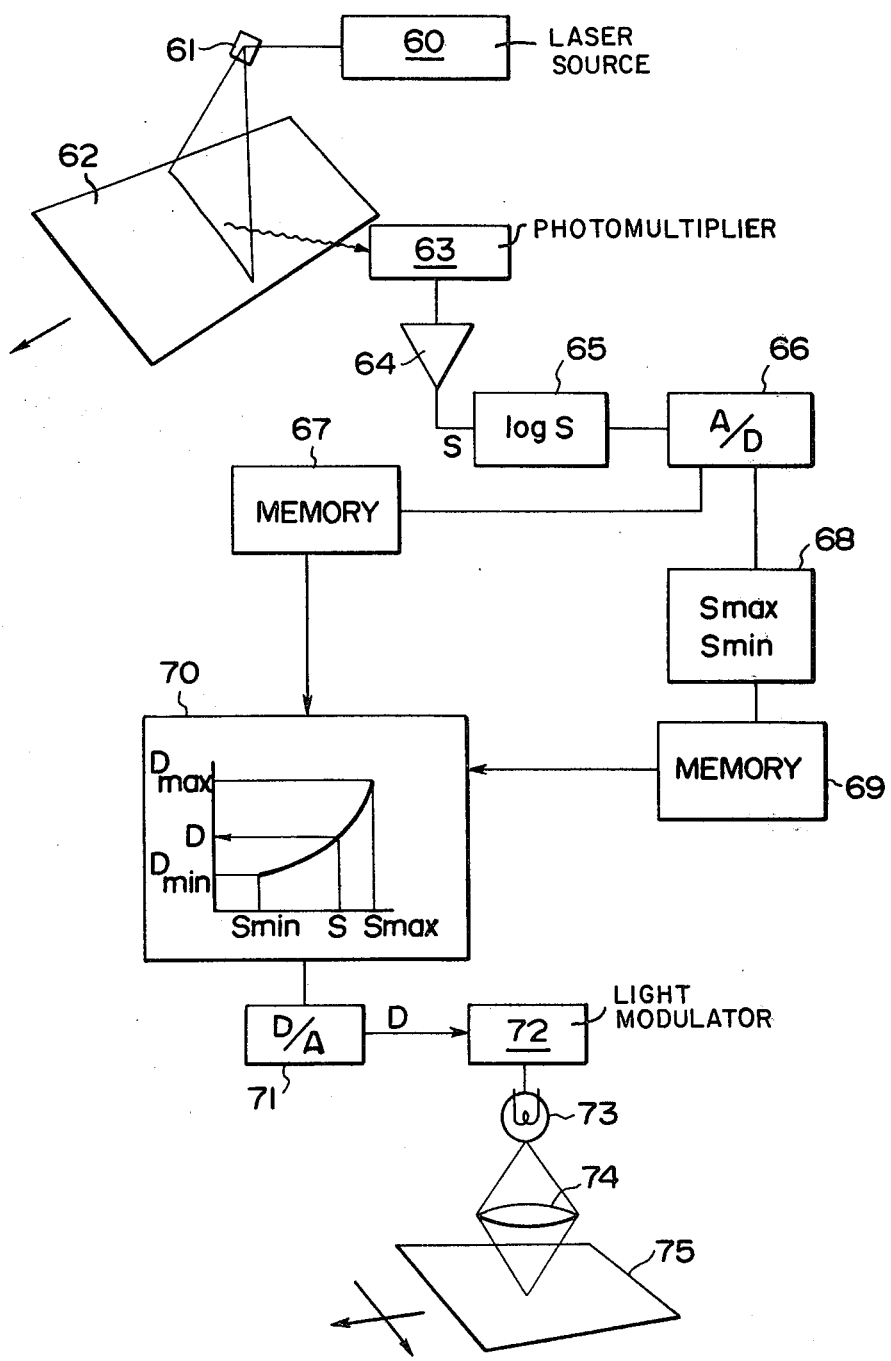
FIG. 6 is a schematic diagram showing the whole system of the radiation image recording system in which another embodiment of the apparatus in accordance with the present invention is employed.

FIG. 6 shows still another embodiment of the present invention. In this embodiment, Smax and Smin are obtained through the signal read-out from a stimulable phosphor sheet 62 by a photomultiplier 63 upon stimulation of the sheet 62 with a laser beam from a laser source 60. The laser source 60 emits a laser beam which is scanned on the stimulable phosphor sheet 62 by means of a mirror 61. The output of the photomultiplier 63 is amplified by an amplifier 64 and then log-converted by a log conversion circuit 65 and A/D converted by an A/D converter 66 into a digital value. The image information converted into the digital value is all memorized in a memory 67 like a magnetic disc or the like. On the other hand, Smax and Smin are obtained by use of a maximum and minimum discriminating circuit 68 and then memorized in another memory 69.

Then, all the image information from the memory 67 and Smax and Smin from the memory 69 are put into a digital arithmetic unit 70 and Smin is converted to Dmin and Smax to Dmax and the level therebetween is changed according to the desired conversion function. The output of the digital arithmetic unit 70 is D/A converted to an analog signal D by use of a D/A converter 71, and the light modulator 72 is modulated by the analog signal D. By the output of the light modulator 72 the recording light source 73 is modulated. The modulated light is converged on the photosensitive material 75 like a photographic film by use of a condenser lens 74, and the photosensitive material 75 is moved in a two-dimensional plane to reproduce a radiation image thereon. The phosphor sheet 62 is moved in the direction perpendicular to the scanning direction by the scanning mirror 61 so as to be scanned in two-dimensional as a result. It should be noted that the output of the D/A converter 71 may be put into a light modulator of a laser scanning type recording system as shown in FIG. 1.

We claim:

1. In a method of processing the gradation of a radiation image recorded in a stimulable phosphor in a pattern of radiation energy stored therein where the stimulable phosphor is scanned by a stimulating ray to emit light of the amount proportional to the level of the radiation energy stored, the emitted light is converted to an electric signal having a level corresponding to the emitted amount of the light, and a visible image corresponding to said radiation image is reproduced on a recording material by use of the electric signal, the method of processing the gradation of the radiation image comprising;

processing the electric signal at the minimum and maximum levels thereof so that the radiation image of the density corresponding to the minimum level of the electric signal is reproduced on the recording material in the optical density within the range of the fog density to the fog density plus 0.3 in terms of optical density, and the radiation image of the density corresponding to the maximum level of the electric signal is reproduced on the recording material in the optical density within the range of 1.5 to 2.8 in terms of optical density, and processing the electric signal of the level in the range between the minimum and maximum levels so that the derivative $$(\gamma = \frac{\partial f(S)}{\partial S})$$

of a density curve $(D = f(S))$ drawn in a coordinate in which the ordinate represents the optical density (D) of the reproduced image on the recording material and the abscissa represents the level of the electric signal (S) is always positive $(\gamma > 0)$.

2. A method of processing the gradation of a radiation image as defined in claim 1 wherein said density curve satisfies the conditions of $$Df \leq f(Smin) \leq Df + 0.3,$$

$$1.5 \leq f(Smax) \leq 2.8, \text{ and}$$

$$f(Sp) < f_0(Sp)$$

where Smin and Smax are the minimum and maximum levels of the electric signal and Sp is a predetermined level of the electric signal between Smin and Smax (Smin < Sp < Smax), f(Smin), f(Smax) and f(Sp) are optical densities of the reproduced image corresponding to the electric signal having the levels of Smin, Smax and Sp, respectively, Df is the fog density in terms of optical density, and $f_0(S)$ is a liner function represented by a straight line in said coordinate passing through the two points where the level of the electric signal has the minimum and maximum levels $[f_0(Smin) = f(Smin), f_0(Smax) = f(Smax)]$.

3. A method as defined in claim 2 wherein the condition of $$f_0(Sp) - 0.5 \leq f(Sp) < f_0(Sp)$$

is satisfied.

4. A method as defined in claim 3 wherein said condition is $$f_0(Sp) - 0.45 \leq f(Sp) \leq f_0(Sp) - 0.1.$$

5. A method as defined in any one of claims 2 to 4 wherein said predetermined level Sp satisfies the formula of $$0.1 \leq \frac{Sp - Smin}{Smax - Smin} \leq 0.7.$$

6. A method as defined in claim 5 wherein said formula is $$0.2 \leq \frac{Sp - Smin}{Smax - Smin} \leq 0.6.$$

7. A method as defined in any one of claims 2 to 4 wherein the second derivative of said density curve is positive or zero $$(\frac{\partial^2 f(S)}{\partial S^2} = \frac{\partial \gamma}{\partial S} \geq 0)$$

at least in the range below said predetermined level $(S < Sp)$.

8. A method as defined in claim 7 wherein the second derivative of said density curve is positive or zero $$(\frac{\partial^2 f(S)}{\partial S^2} = \frac{\partial \gamma}{\partial S} \geq 0)$$

throughout the range from the minimum level to the maximum level (Smin < S < Smax).

9. A method as defined in any of claims 2 to 4 wherein the derivative of said density curve is continuous at least in the range below said predetermined level (S < Sp).

10. A method as defined in claim 9 wherein the derivative of said density curve is continuous throughout the range from the minimum level to the maximum level (Smin < S < Smax).

11. An apparatus for processing the gradation of a radiation image in a radiation image recording system which comprises radiation image read-out means including scanning means for scanning a stimulable phosphor carrying a radiation image stored therein with a stimulating ray, a reading means for reading out the radiation image stored therein by detecting the light emitted from the stimulable phosphor upon stimulation thereof and converting the light to an electric signal having a level corresponding to the amount of the emitted light, a signal processing means for processing the electric signal, a modulating means controlled by the processed electric signal, and a recording means controlled by the modulating means for reproducing on a recording material an image corresponding to the radiation image recorded in the stimulable phosphor, said signal processing means comprising a signal converting means which converts the electric signal of the minimum level corresponding to the minimum amount of the light emitted from the stimulable phosphor to the level which results in the optical density in the image reproduced on the recording material within the range from the fog density of the recording material to the fog density plus 0.3 in terms of optical density, converts the electric signal of the maximum level corresponding to the maximum amount of the light emitted from the stimulable phosphor to the level which results in the optical density in the image reproduced on the recording material within the range from 1.5 to 2.8 in terms of optical density, and converts the electric signal of the level between the minimum level and the maximum level to a level which results in the optical density in the image reproduced on the recording material that monotonously increases as the level of the electric signal rises.

12. An apparatus as defined in claim 11 wherein said reading means comprises a photoelectric converter which converts the amount of light received thereby to an electric signal having a level corresponding to the amount of the light, and an amplifier which amplifies the electric signal obtained by the photoelectric converter, and said signal processing means including means for making log-conversion and non-linear conversion of the output of the amplifier.

13. An apparatus as defined in claim 12 wherein said signal converting means is a means for controlling the gain of said photoelectric converter.

14. An apparatus as defined in claim 12 wherein said signal converting means is a means for controlling the gain of said amplifier.

15. An apparatus as defined in claim 11 wherein said recording means is a laser beam scanning type recorder, and said modulator is a light modulator.

16. An apparatus as defined in claim 11 wherein said signal converting means includes means for detecting the light emitted from the stimulable phosphor at the time the radiation image is recorded in the stimulable phosphor by exposure thereof to a radiation passing through an object, and means for detecting the substantial minimum and maximum amounts of the light emitted.

17. An apparatus as defined in claim 11 wherein said signal converting means includes means for detecting the light emitted from a monitoring phosphor sheet located behind the stimulable phosphor at the time the radiation image is recorded in the stimulable phosphor by exposure thereof to a radiation passing through an object, and means for detecting the substantial minimum and maximum amounts of light emitted.

18. An apparatus as defined in claim 11 wherein said signal converting means includes means for detecting the substantial minimum and maximum levels of the electric signal given by said reading means.

* * * * *